United States Patent
Schmuda von Trzebiatowski et al.

(10) Patent No.: US 7,237,842 B2
(45) Date of Patent: Jul. 3, 2007

(54) HEADREST, PARTICULARLY FOR A MOTOR VEHICLE SEAT

(75) Inventors: Peter Schmuda von Trzebiatowski, Kneitlingen (DE); Ronald List, Hahnbach (DE); Marian Skiora, Düesseldorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 10/549,600

(22) PCT Filed: Mar. 22, 2004

(86) PCT No.: PCT/EP2004/003007

§ 371 (c)(1),
(2), (4) Date: Feb. 28, 2006

(87) PCT Pub. No.: WO2004/082988

PCT Pub. Date: Sep. 30, 2004

(65) Prior Publication Data

US 2006/0181117 A1 Aug. 17, 2006

(30) Foreign Application Priority Data

Mar. 20, 2003 (DE) ............................... 103 13 797

(51) Int. Cl.
*B60N 2/48* (2006.01)

(52) U.S. Cl. ........................................ 297/391; 297/408

(58) Field of Classification Search ............... 297/391, 297/408
See application file for complete search history.

(56) References Cited

U.S. PATENT DOCUMENTS

| 4,720,146 | A  |   | 1/1988  | Mawbey et al. ............. 297/409 |
| 4,844,544 | A  | * | 7/1989  | Ochiai ........................ 297/408 |
| 6,079,776 | A  |   | 6/2000  | Breitner et al. ........ 297/216.12 |
| 6,120,099 | A  | * | 9/2000  | Reikeras et al. ............ 297/391 |
| 6,250,716 | B1 |   | 6/2001  | Clough ........................ 297/408 |
| 6,305,749 | B1 | * | 10/2001 | O'Connor et al. .......... 297/397 |
| 6,467,846 | B2 | * | 10/2002 | Clough ........................ 297/410 |
| 2001/0026090 | A1 | * | 10/2001 | Bartels ....................... 297/391 |

FOREIGN PATENT DOCUMENTS

| DE | 195 28 716 A1 | 2/1997 |
| DE | 197 24 764 C1 | 10/1998 |
| DE | 197 54 168    | 6/1999 |
| DE | 100 05 196 A1 | 8/2001 |
| DE | 202 05 348 U1 | 8/2002 |
| DE | 202 04 949 U1 | 6/2003 |
| DE | 102 09 187 C1 | 8/2003 |
| GB | 1 592 141     | 7/1981 |
| JP | 10-23941      | 1/1998 |

* cited by examiner

*Primary Examiner*—Peter R. Brown
(74) *Attorney, Agent, or Firm*—Norris McLaughlin & Marcus PA

(57) ABSTRACT

The invention relates to a headrest (10), particularly for a motor vehicle seat. At least on element is provided that can be displaced relative to a retaining device (12) of the headrest (10). The at least one element can be displaced, in part and/or in total, about at least one horizontal rotation axis and/or at least one vertical rotation axis and can be locked in selectable displaced positions.

4 Claims, 3 Drawing Sheets

HEADREST, PARTICULARLY FOR A MOTOR VEHICLE SEAT

Figure 4:
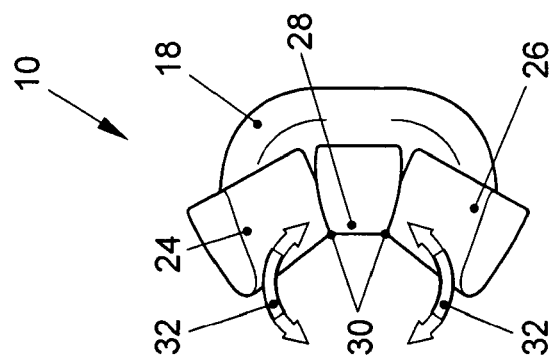

The invention is directed to a headrest, in particular for a motor vehicle seat.

Headrest, in particular for motor vehicle seats, are known since some time. The height of conventional headrests can be adjusted in relation to the motor vehicle seat. Also known are headrests having separately adjustable leaves or ears.

A prior patent DE 102 09 187 C1 discloses a headrest, which is connected to the vehicle seat by a linkage assembly and has a center pad and two side pads arranged adjacent to the right and left sides of the center pad. The side pads can be pivoted from a rearward support position into a forward contact position. The inclination of the headrest relative to a back rest of the vehicle seat can also be pivotally adjusted.

DE 195 28 716 A1 discloses another headrest for a vehicle seat having a back rest, with a head pad secured to two support rods for attachment in the back rest and two lateral slumber pads associated with the head pad. In the operating position, the slumber pads protrude laterally from the upholstered front of the head pad. The slumber pads are received within the contour of the head pad when not in use. Each slumber pad is pivotally supported on a vertical tubular section, which is in turn pivotally supported on a support rod for rotation about a transverse rotation axis.

Other types of headrests for seats are disclosed in DE 197 54 168 A1, DE 202 05 348 U1, and DE 197 24 764 C1, which include headrest elements that can be displaced about an essentially vertical rotation axis.

It is an object of the invention to provide a headrest which can be operated more comfortably.

The object is solved with the invention by a headrest with the features recited in claim 1. The headrest can be adjusted in many different positions by providing at least one element which is displaceable relative to a retaining device of the headrest, wherein the at least one element can be displaced, in part and/or entirely, about at least one horizontal rotation axis and/or at least one vertical rotation axis, and can be locked in a selectable displaced position. In particular, the lateral partial segments (ears) of the headrest can thus be adjusted continuously and/or step-wise. The inclination of parts of the headrest or of the entire headrest can also be adjusted, in this case in particular about a rotation axis located in the upper region of the headrest, preferably in the forward direction, i.e., in the direction of travel.

In an advantageous embodiment of the invention, the headrest can be formed in two sections, wherein a first section enables displacement about the at least one vertical rotation axis, and a second section enables displacement about the at least one horizontal rotation axis. The headrest can then be particularly easily adjusted. A displacement about the at least one vertical rotation axis and a displacement about the at least one horizontal rotation axis can be readily superimposed.

According to another advantageous embodiment of the invention, the first section can be connected to the second section by at least one friction connection, wherein the friction connection is preferably adjustable. At least partial regions of the first section can then be displaced continuously relative to the second section. In particular, the upholstered pads of the headrest can be individually adjusted when these partial regions of the first section form the lateral partial segments of the headrest. The position can be adjusted according to individual user preferences, which enhances the user comfort.

According to yet another advantageous embodiment of the invention, the second section is connected to the support device of the headrest, preferably by a friction connection. The headrest can then be easily pivoted about the horizontal rotation axis and continuously adjusted. The preferably friction-type connection between the first section and the second section displaces the first section about the horizontal rotation axis, while the second section performs a pivoting motion relative to the support device of the headrest and hence also relative to the seat, in particular the motor vehicle seat with the headrest. The headrest can thus be separately adjusted by the displacement about the horizontal rotation axis or about the at least one vertical rotation axis.

In addition, in an advantageous embodiment of the invention, the first section of the headrest is formed in three parts which are connected to each other via a respective film hinge. The first section can advantageously be implemented as a one-piece headrest, whereby two lateral partial segments are formed, which can be used to individually position the headrest in a so-called slumber position, without adversely affecting the visual appearance.

Additional advantageous embodiments of the invention are recited as features of the other dependent claims.

Figure 3:
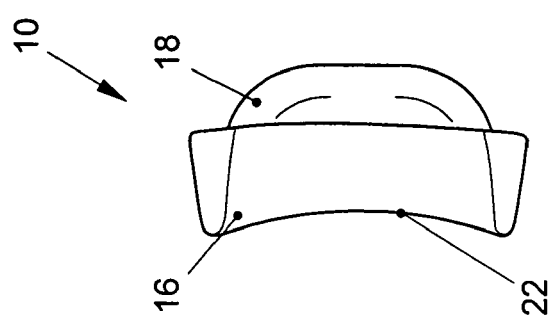
Figure 2:
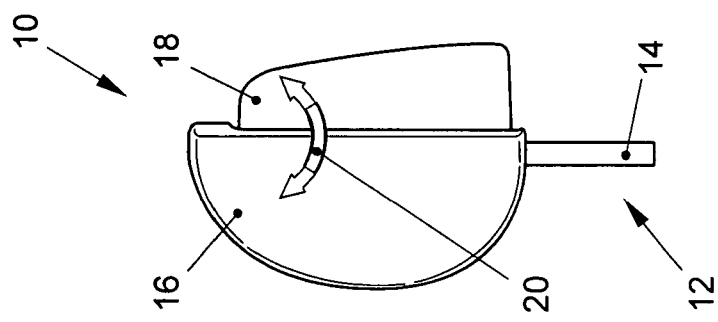
Figure 1:
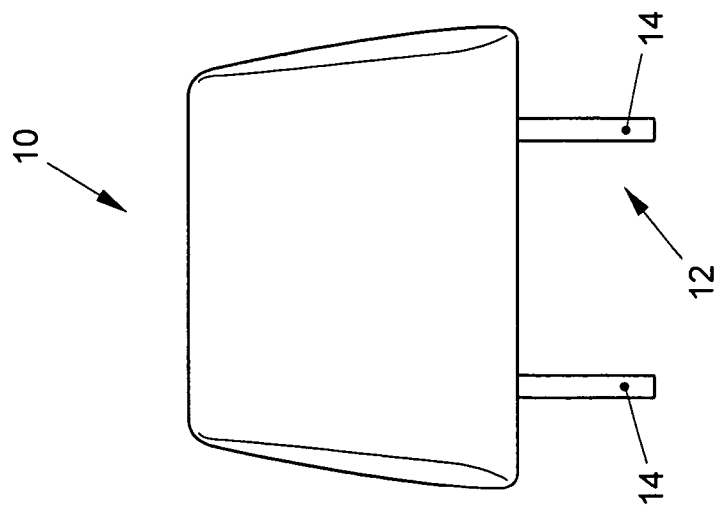
Figure 5:
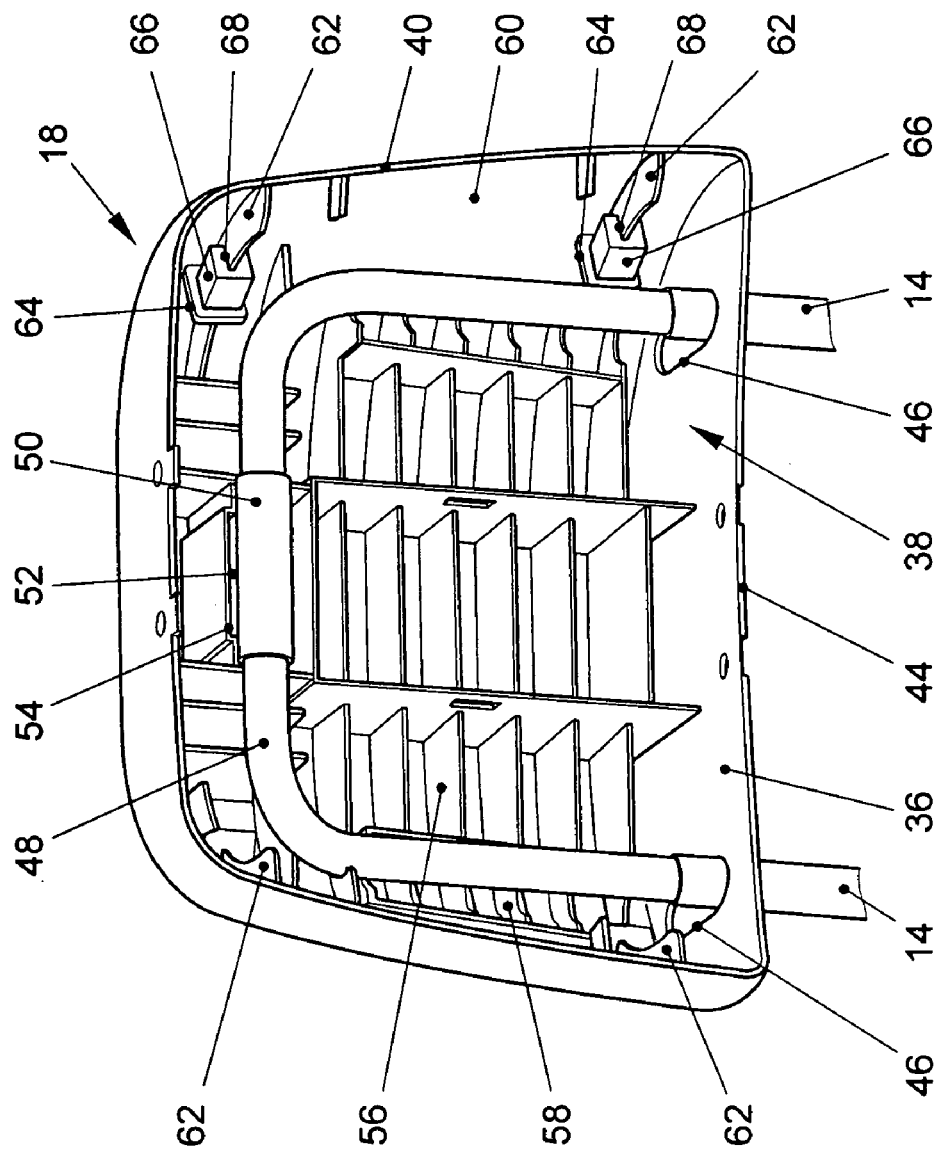

An exemplary embodiment of the invention will now be described in more detail with reference to the corresponding drawings. It is shown in:

FIGS. 1 to 3 different views of the headrest according to the invention in a first position;

FIG. 4 a top view of the headrest in a second position;

FIG. 5 a perspective view of the first section of the headrest; and

Figure 6:
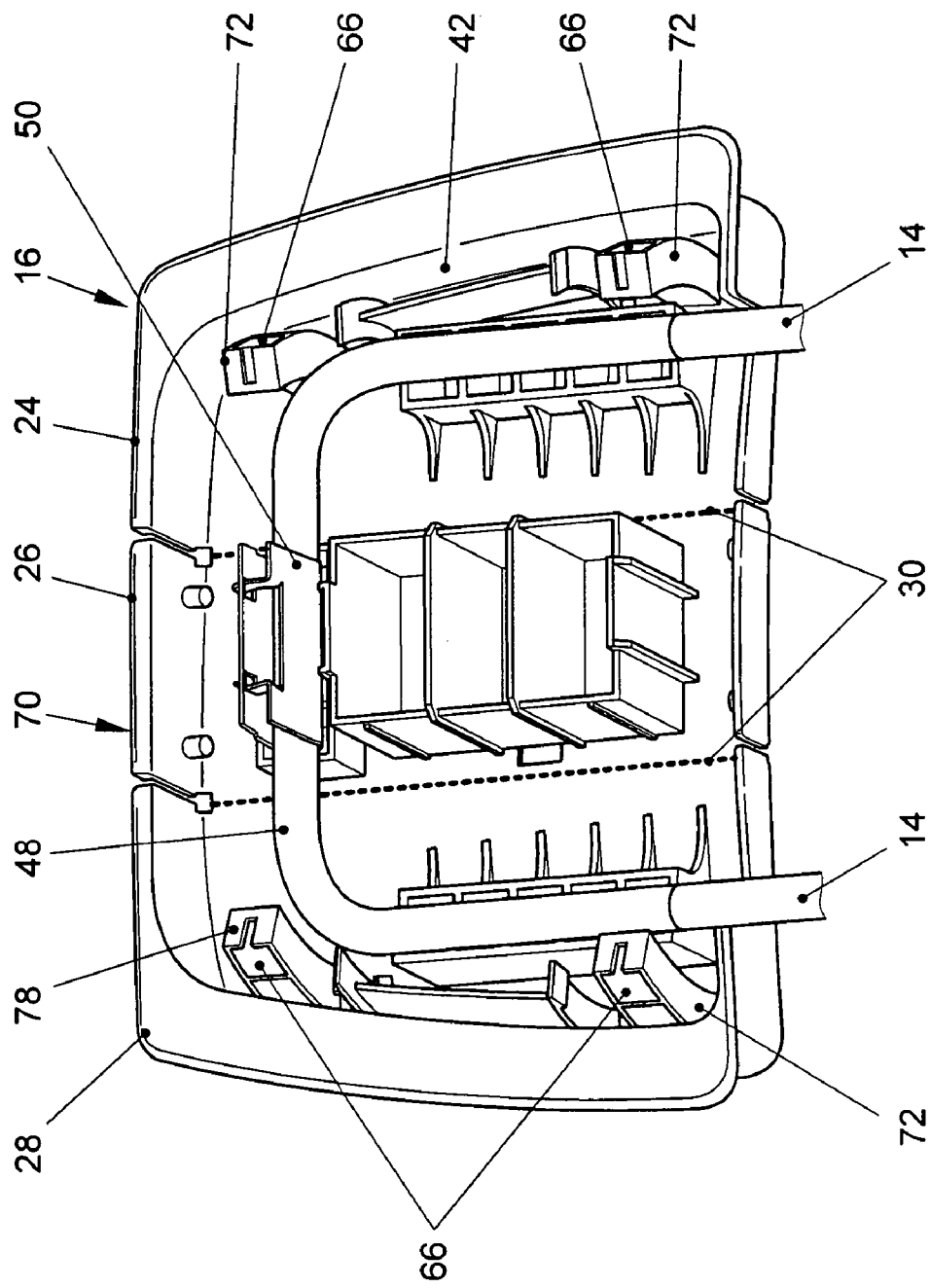

FIG. 6 a perspective view of a second section of the headrest.

FIG. 1 shows a headrest having the general reference numeral 10, which can be connected to a motor vehicle seat (not shown) by a support device 12. The support device 12 includes conventional support rods 14, which can be inserted in corresponding openings in the motor vehicle seat. The height of the headrest can be adjusted mechanically and/or electrically in a conventional manner.

FIG. 2 shows a side view of the headrest 10, which clearly shows that the headrest 10 is comprised of a first section 16 and a second section 18. The first section 16 is oriented in the travel direction, i.e., it faces a person occupying the vehicle seat. The section 18 is arranged accordingly opposite to the travel direction. As indicated by a double arrow 20, the headrest can be pivoted about an essentially horizontal rotation axis relative to the support device 12 and hence also relative to the vehicle seat. The inclination of the headrest 10 can be adjusted over an angular range between 0° and 45°, in particular between 10° and 20°, preferably 15°.

FIG. 3 shows a top view of the headrest 10. As clearly seen, the section 16 has a concave camber 22 in the travel correction. The surface forming the camber 22 forms a resting place for the head of a person occupying the motor vehicle seat.

FIG. 4 shows another top view of the headrest 10, which shows clearly that the section 16 is comprised of three partial segments 24, 26 and 28. Each of the partial segments 24 and 26 is connected to the partial segment 28 via a film hinge 30. By forming the film hinge 30, the lateral partial segments 24 and 26 can be displaced relative to the partial segment 28 about essentially vertical rotation axes. According to the indicated double arrows 32, the angular ranges of the displacement can range from 0° to 50°, in particular from 20° to 40°, preferably 35°.

FIG. 5 show schematically a perspective view of the second section 18, while FIG. 6 shows schematically a perspective view of the first section 16.

The second section 18 is made of a shell-shaped element 34, with an external edge 36 enclosing an interior space 38. An outside contour 40 of the second section 18 matches an inside contour 42 of the first section 16 (FIG. 6). As shown in FIGS. 2 and 3, the sections 16 and 18 are formed so that they can be at least partially inserted into each other. In particular, the sections 16 and 18 can be inserted into each other by such a distance that the external edge 36 of the section 18 still remains inside the section 16 when the lateral partial segments 24 and 26 of the section 16 are pivoted, as shown in FIG. 4. This prevents the formation of a greater gap between the section 16 and 18, when the partial segments 24 and 26 are pivoted.

The section 44 of the external edge 36 oriented in the direction of the motor vehicle seat has two slots 46, through which the support rods 14 of the support device 12 extend. The support rods 14 are connected to each other via a horizontal arm 48. The arm 48 extends through a sleeve 50, which is in turn connected by a positive fit and/or friction-locked with the section 18. The sleeve 50 includes an insertion section 52 which extends essentially radially with respect to the arm 48. The insertion section 52 can be inserted into a complementary seat 54 of the section 18. A friction connection, such as a snap-on connection and the like, can be implemented between the insertion section 52 and 54.

An outside diameter of the arm 48 corresponds essentially to an inside diameter of sleeve 50. A friction connection is formed between the sleeve 50 and the arm 48. With this design, the section 18 can be pivoted about the arm 48 by applying a minimum force determined by the friction connection. The arm 48 therefore represents the horizontal rotation axis of the headrest 10. The pivoting motion can be restricted within predetermined limits by the geometry of the slots 46.

The section 18 forms a ribbed structure 56 facing the interior space 38 to ensure the mechanical stability of the section 18. At the same time, marginal regions 58 of the ribbed structure 56 form limits stops which can make contact with the support rods 14. More or fewer of the marginal regions 58 comes into contact with the support rods 14 depending of the inclination adjustment of the section 18, which ensures that the section 18 is supported.

The view of FIG. 5 also shows collar-shaped shoulders 62 formed on the interior walls 60 of the section 18. As will be described below, these shoulders 62 represent guide members for the partial segments 24 and 26 of the first section 16.

The shoulders 62 forming the guide members have a limit stop 64, which forms a limit stop for the movement of the friction elements 66 guided on the shoulders 62. The friction elements 66 have a slot 68 which is open at the edge, so that the friction elements 66 are semi-attached to the shoulders 62. The friction elements 66 are part of the first section 16 and are shown in FIG. 5 for clarity only.

As shown in FIG. 6, the first section 16 is also formed as a shell-shaped element 70; the three partial segments 24, 26 and 28 are also visible. Each of the partial segments 24 and 28 is connected to the partial segments 26 via a respective film hinge 30. FIG. 6 also shows the support device 12 with its support rods 14. Also depicted is the sleeve 50 which surrounds the arm 48 and engages in the seat 54 of the second section.

Curved cantilevers 72 extend from the partial segments 24 and 28. The cantilevers 72 are adapted to receive the friction elements 66 with a positive fit and/or with a friction-lock. The friction elements 66 have therefore a defined position relative to the partial segments 24 and/or 28.

When the headrest 10 is completely assembled, as illustrated in FIGS. 1 to 4, the shoulders 62 engage in the slot 68 of the friction elements 66, thereby guiding the partial segments 24 and 28. These partial segments 24 and 28 can then be displaced about the essentially vertical rotation axes formed by the film hinges 30, as illustrated in FIG. 4. The partial segments 24 and 28 can be locked in continuously selectable positions by way of the friction connection between the friction elements 66 and the shoulders 62.

LIST OF A REFERENCE SYMBOLS 10 headrest
12 support device
14 support rods
16 first section headrest 10
18 second section headrest 10
20 pivot direction headrest 10
22 camber
24 partial segment of 16
26 partial segment of 16
28 partial segment of 16
30 film hinge
32 displacement direction
34 shell-shaped element
36 external edge
38 interior space
40 outside contour
42 inside contour
44 section of 36
46 slots
48 arm
50 sleeve
52 insertion section
54 seat
56 ribbed structure
58 marginal regions
60 inside wall
62 collar-shaped shoulders
64 limit stop
66 friction elements
68 slot open at the edge
70 shell-shaped element
72 cantilevers

The invention claimed is:

1. A headrest for a motor vehicle seat, comprising:
a retaining device,
a forward section connected to a rear section, the forward section, comprising at least two vertical segments being at least one outer segment and a center segment, the outer segment being displaceable about a vertical rotation axis,
the headrest being displaceable with respect to the retaining device by a pivoting motion of the forward and rear sections together about a horizontal rotation axis,
at least one of said vertical segments of the forward section being connected to the rear section via at least one second friction connection, and
the second friction connection comprising
a friction retaining element on the outer segment, the friction retaining element comprising a slot, and
at least one guide member formed on the rear section engageable with the slot on the friction retaining element, the rear section being connected to the retaining device via a first friction connection, and wherein the at least one outer segment and/or the headrest is lockable by said first friction connection in respective selectable displaced positions in the interior of the headrest.

2. The headrest according to claim 1, wherein the forward section comprises three vertical segments, being a first outer segment, the central segment and a second outer segment, wherein the outer segments are connected to the central segment for hinged rotation about a respective vertical axis.

3. The headrest according to claim 1, wherein the retaining device comprises a sleeve through which an arm of the retaining device extends and which is connected to the rear section.

4. The headrest according to claim 1, wherein the forward and rear sections are shell-shaped, wherein an inside contour of a shell of the forward section conforms to an outside contour of a shell of the rear section.

* * * * *